United States Patent
Popov et al.

(10) Patent No.: US 6,533,990 B2
(45) Date of Patent: Mar. 18, 2003

(54) APPARATUS FOR DISTILLING MOLTEN BATHS

(75) Inventors: Ivaylo Popov, Hanau (DE); Hans-Jürgen Kemmer, Rödermark (DE); Harald Scholz, Rodenbach (DE)

(73) Assignee: Ald Vacuum Technologies AG, Hanau (DE)

( * ) Notice: Subject to any disclaimer, the term of this patent is extended or adjusted under 35 U.S.C. 154(b) by 0 days.

(21) Appl. No.: 10/180,960

(22) Filed: Jun. 26, 2002

(65) Prior Publication Data

US 2003/0025253 A1 Feb. 6, 2003

(30) Foreign Application Priority Data

Aug. 3, 2001 (DE) .......................... 101 34 286

(51) Int. Cl.[7] .............................. C22B 9/02
(52) U.S. Cl. ....................... 266/87; 266/149
(58) Field of Search ................. 266/87, 149; 75/10.29, 75/10.3, 10.31, 382

(56) References Cited

U.S. PATENT DOCUMENTS 2,229,716 A * 1/1941 Blackwell et al. .......... 75/10.3

FOREIGN PATENT DOCUMENTS

| DE | 33 37657 C2 | 4/1985 | |
| EP | 0 124635 B1 | 11/1984 | |
| GB | 2 210 629 A | 6/1989 | |
| JP | 62-266125 | * 11/1987 | ............ 266/149 |

OTHER PUBLICATIONS

Zur Verdampfund . . . Druck, Illschner, et al. pp. 626–632 dated 1960.

* cited by examiner

Primary Examiner—Melvyn Andrews
(74) Attorney, Agent, or Firm—Fulbright & Jaworski L.L.P.

(57) ABSTRACT

In the apparatus for distilling molten baths, substantially comprising a two-part vacuum tank (2), a melting crucible (5) disposed in the bottom housing part (3) of the vacuum tank and surrounded by a heating coil (4), a hat-shaped metal vapor condenser (8) held in the top housing part (6) of the vacuum tank (2), and a draining channel (10) disposed between the melting crucible (5) and the metal vapor condenser (8), a filter element (16) penetrated by a metal vapor thermometer (19) plus probe (20) is provided above the metal vapor condenser (8) in an opening (15) of the top housing part (6), wherein both the filter pot (17) surrounding the filter element (16), as well as the space (22) behind the coil, as well as the top housing part (6) are connected by separate individual vacuum lines (18, 23, 25) to a vacuum source (7).

8 Claims, 1 Drawing Sheet

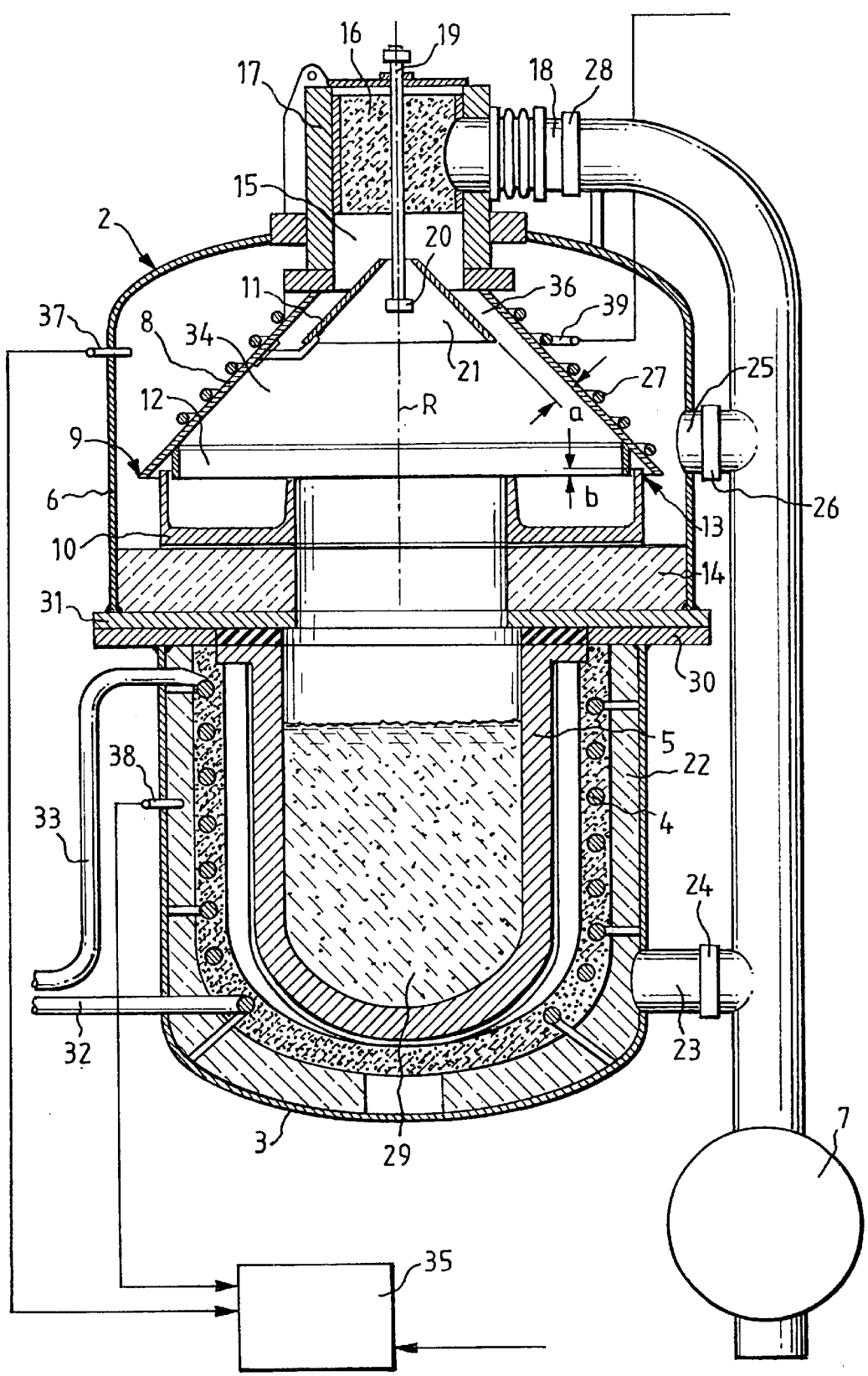

APPARATUS FOR DISTILLING MOLTEN BATHS

FIELD OF THE INVENTION

The invention relates to an apparatus for distilling molten baths, comprising a pot-shaped bottom housing part for receiving a melting crucible surrounded by a heating coil and comprising a hood-shaped top housing part connectable in a pressure-proof manner to the bottom housing part.

BACKGROUND OF THE INVENTION

In metalworking industrial enterprises, large quantities of residual material containing a large number of different alloying metals constantly arise, wherein said alloying metals are for the most part present in low or changing mixture ratios in the material. Not least for economic reasons, it is necessary to subject said residual material and technical products to a reclamation process. Such a process makes use of the fact that the alloying metals have different melting points and the metal alloys separate, as they melt down, and boil and/or eate at different temperatures. If an alloy consists e.g. of copper and zinc (brass), the copper melts at 1083° C. and the zinc mixed with the copper melts at 419° C., wherein the zinc has already reached its boiling point at 207° C. and 760 mm mercury column. Mixtures of different metals having different boiling points may therefore be separated from one another, i.e. reclaimed, by distillation followed by condensation.

Apparatuses for distilling and condensing molten baths have therefore already been proposed, which comprise a melting crucible disposed together with a heating coil in a vacuum chamber, wherein provided above the melting crucible is an apparatus for precipitating the metal vapor escaping from the bath. The known apparatuses of said type do however have the drawback that the metals contained in the alloy do not separate from one another completely enough for the metal left in the crucible—i.e. the metal with the highest melting point—to be present in a totally pure form.

Also known is a device for melting down non-ferrous metal scrap and waste, comprising a furnace for receiving a melting crucible, a hood covering the crucible, a storage bin connected to the hood and for receiving the material to be melted down, a charging device, and an exhaust device connected to the hood (DE 33 37 657 C2), wherein the hood is movable between the covering position and a lateral crucible-clearing position and a sealing device, which comes into effect in the covering position, is provided between the hood and the crucible and the storage bin is designed as a batch container sealable in a vacuum-tight manner and is connected in a vacuum-tight manner to the hood and the exhaust device comprises a vacuum pump.

An apparatus for the simultaneous separation of volatile metals, including zinc and lead, from less volatile metals, such as copper from residual material e.g. of molten baths, is moreover known, comprising a reactor with a reactor chamber and a top feed chamber and a vertically extending pipe connecting both chambers, wherein the reactor chamber is connected to an oxygen source and heatable by a plasma generator and the feed chamber is connected by a conduit to a condenser with gas outlet and is provided with a sluice for introducing the batch (GB 22 10 629 A). The material introduced into the pipe is melted open by the plasma generator, wherein the volatile constituents from the reactor chamber rise through the material in the pipe as far as into the feed chamber and there form a cloud above the introduced batch, wherein some of the volatile constituents rise through the conduit as far as into the condenser.

Finally, a method of collecting a metal from gases, which substantially comprise a vapor of said metal, is known, in which an adiabatic expansion of the gases is produced in a Laval nozzle in order to develop a flow, the kinetic energy of which because of the enthalpy drop of the flow and the conversion of the latter into the kinetic energy is so high that the vapor of the metal expands to a pressure and is cooled to a temperature, which is lower than the boiling point of the metal given the pressure, wherein the flow is blown into a bath of molten metal of the same type as the metal vapor, which bath is contained in a receiving container, (EP 124 635 B1).

OBJECT AND SUMMARY OF THE INVENTION

The underlying object of the present invention is therefore to provide an apparatus, which enables complete separation of alloying constituents.

The apparatus is moreover to be of a simple design and usable as universally as possible.

Said object is achieved according to the invention in that both the bottom and the top housing part are connectable to a vacuum source, wherein the top housing part comprises the metal vapor condenser in the shape of a truncated cone, which is moulded from a sheet metal blank and of which the bottom edge facing the melting crucible and formed by the larger base circle is situated above an annular or toroidal draining channel or drip pan, wherein a ball-cup-shaped or truncated-cone-shaped metal vapor baffle element is disposed in the top part of the metal vapor condenser, close to the focus of its truncated-cone-shaped lateral surface, wherein the lateral surface of the metal vapor baffle element extends with slight clearance relative to the inner surface of the metal vapor condenser.

The metal vapor condenser at its bottom edge facing the melting crucible is preferably provided with a drip edge in the form of a circular-cylindrical ring, which is firmly connected to the sheet metal blank and of which the edge portion facing the melting crucible dips by a small amount into the draining channel and, together with the radially outer wall portion of the draining channel, forms a labyrinth seal.

At the top end of the hood-shaped housing part an opening is advantageously provided, into which a filter element is inserted, wherein the gases or vapors passing through the filter element enter a filter pot, which rests on the top housing part and is connected by a first vacuum line to the vacuum source.

Further details and features of the invention are described in detail and characterized in the claims.

The invention allows a wide variety of possible designs; one of these is illustrated in detail purely schematically in the accompanying drawing.

BRIEF DESCRIPTION OF THE DRAWINGS

The FIGURE depicts a preferred embodiment of the invention.

DETAILED DESCRIPTION

The apparatus substantially comprises a bottom housing part 3 having a collar 30 disposed in a fixed manner on its top edge, a top housing part 6 having a flange 31 on its bottom edge, a melting crucible 5 inserted into the bottom housing part 3, a heating coil 4 surrounding the melting crucible 5 and having the electric conductors 32, 33, an inner ring 14 held in the top housing part 6 and having a draining channel 10 resting thereon, a metal vapor condenser 8 disposed above the draining channel and having a cooling/heating tube coil 27 fastened on its outer surface, a filter pot 17 resting on an opening of the top housing part 6 and comprising a filter element 16 penetrated by a metal vapor thermometer 19 with probe 20, a metal vapor baffle element 11 projecting into the hat-shaped metal vapor condenser 8, and a vacuum source 7 connected by branch lines 18, 23, 25 to the vacuum tank 3, 6.

The molten bath 29, which is to be distilled, is heated by means of the heating coil 4 until the first metal of the alloy in the melting crucible 5 to boil passes as vapor into the condenser chamber 34 and precipitates on the inner lateral surface of the hat-shaped metal vapor condenser 8 and then runs down the inner surface and finally collects in the draining channel 10. Other vapors, in particular of additives or impurities contained in the alloy 29, are directed by the metal vapor baffle element 11 via the annular gap 36 and the opening 15 onto the filter element 16 and collected there. The described distillation process presupposes that specific pressures prevail in the interior of the two-part vacuum tank 2, which is why a total of three vacuum lines 18, 23, 25 with valves 24, 26, 28 inserted therein are provided, by means of which the pressures in the individual compartments of the vacuum tank 2 are adjustable. Adjustment of the pressures is effected by means of a controller 35 in dependence upon sensors 37, 38, 39, which are provided at various points of the apparatus and by means of which both the pressures and temperatures may be registered. For distilling the molten bath 29, the latter is superheated while, at the same time, a pressure reduction of the atmosphere prevailing above the melting crucible 5 is effected. The working temperature of the metal vapor condenser 8 is determined in dependence upon the composition of the bath 29 and of the achieved state of aggregation of the condensation product, and indeed in the individual distillation stages differently and in accordance with the respective bath/condensation product temperature.

It is claimed:

1. An apparatus for distilling molten baths comprising a pot-shaped bottom housing part for receiving a melting crucible encompassed by a heating coil, a hood-shaped top housing part connectable in a pressure-proof manner to the bottom housing part;

wherein both the bottom and the top housing part are connected to a vacuum source and wherein the top housing part comprises a metal condenser in the shape of a truncated cone, which is moulded from a sheet metal blank and of which the bottom edge facing the melting crucible and formed by the larger base circle is situated immediately above a circular or toroidal draining channel or drip pan, of which the vertically extending axis of rotation coincides with the axis of rotation of the truncated-cone-shaped metal condenser, wherein a ball-cup-shaped or truncated-cone-shaped metal baffle element is disposed in the top part of the metal condenser close to the focus of its truncated-cone-shaped lateral surface, wherein the lateral surface of the metal baffle element extends with slight clearance (a) relative to the inner surface of the metal condenser.

2. An apparatus according to claim 1, wherein the metal condenser at its bottom edge facing the melting crucible is provided with a drip edge in the form of a circular-cylindrical ring, which is firmly connected to the sheet metal blank and of which the edge portion facing the melting crucible dips by a small amount (b) into the draining channel and, together with the radially outer wall portion of the draining channel, forms a labyrinth seal.

3. An apparatus according to claim 1, wherein the draining channel rests on an approximately circular-cylindrical inner ring made of refractory material, which in turn is held by the hood-shaped top housing part.

4. An apparatus according to claim 1, wherein at the top end of the hood-shaped housing part an opening is provided, into which a filter element is inserted, wherein the gases or s passing through the filter element enter a filter pot, which rests on the top housing part and is connected by a first vacuum line to the vacuum source.

5. An apparatus according to claim 1, wherein disposed on the top hood-shaped housing part or on the filter pot is a metal thermometer, the probe of which extends as far as into the space enclosed by the metal baffle element.

6. An apparatus according to claim 1, wherein the space between the pot-shaped bottom housing part and the heating coil is connected by a second vacuum line to the vacuum source, wherein a vacuum valve is inserted into the second vacuum line.

7. An apparatus according to claim 1, wherein the top hood-shaped housing part is connected to a third vacuum line, which opens into the top housing part approximately in the region of the bottom edge of the metal condenser, wherein a shut-off organ or a valve is inserted into the third vacuum line connected to the vacuum source.

8. An apparatus according to claim 1, wherein the outer lateral surface of the sheet metal blank of the metal condenser is provided with a cooling or heating tube coil.

* * * * *

UNITED STATES PATENT AND TRADEMARK OFFICE
CERTIFICATE OF CORRECTION

PATENT NO. : 6,533,990 B2 Page 1 of 1
DATED : March 18, 2003
INVENTOR(S) : Ivaylo Popov et al.

It is certified that error appears in the above-identified patent and that said Letters Patent is hereby corrected as shown below:

<u>Title page,</u>
Item [73], Assignee, change "Ald" to -- ALD --

Signed and Sealed this

Thirteenth Day of May, 2003

JAMES E. ROGAN
*Director of the United States Patent and Trademark Office*